United States Patent [19]
Work

[11] 4,372,063
[45] Feb. 8, 1983

[54] BRUSH CLEARING APPARATUS FOR A BULLDOZER BLADE

[76] Inventor: Casey N. Work, P.O. Box 306, Dunlap, Calif. 93621

[21] Appl. No.: 249,183

[22] Filed: Mar. 30, 1981

[51] Int. Cl.³ .............................................. A01B 13/00
[52] U.S. Cl. .................... 37/2 R; 37/117.5; 37/DIG. 3; 414/912
[58] Field of Search ............ 37/2 R, 2 P, 117.5, 37/DIG. 3, DIG. 12; 414/722–724, 912; 144/2 N, 34 A, 34 B, 34 C

[56] References Cited

U.S. PATENT DOCUMENTS

| | | | |
|---|---|---|---|
| 2,262,415 | 11/1941 | Williams | 414/912 |
| 2,632,261 | 3/1953 | Ferris, Jr. | 37/2 R |
| 2,633,164 | 3/1953 | Kissner et al. | 144/34 A |
| 2,908,409 | 10/1959 | Hinders et al. | 37/2 R |
| 2,950,551 | 8/1960 | Pesce | 37/2 P |
| 3,163,945 | 1/1965 | Dooley | 37/2 R |
| 3,195,247 | 7/1965 | Grimes | 37/2 R |
| 3,559,314 | 2/1971 | Funk | 37/2 R X |
| 3,595,416 | 7/1971 | Perrotti | 37/117.5 X |
| 4,241,525 | 12/1980 | Mann | 37/DIG. 3 |
| 4,242,035 | 12/1980 | Hornstein | 414/724 |

FOREIGN PATENT DOCUMENTS 387674  8/1973  U.S.S.R. .......................... 37/DIG. 3

*Primary Examiner*—E. H. Eickholt
*Attorney, Agent, or Firm*—Huebner & Worrel

[57] ABSTRACT

A brush clearing apparatus for a bulldozer blade having a rake pivotally mounted on the blade for movement about an axis along the upper edge of the blade between an operational position in which the rake engages the bulldozing face of the blade and a retracted position above the blade, a clamp pivotally mounted on the blade for movement about the axis between a lowered position engaging the rake oppositely of the blade when the rake is in the operational position, teeth individual to the rake and to the clamp and extended in intermeshing relation adjacent to the lower edge of the blade when the clamp is in the lowered position; and a hydraulic ram mounted on the blade for moving the rake between its positions, the apparatus including an element for connecting the rake and the clamp so that raising the clamp to its upper position carries the rake into its retracted position and the blade is usable as if the apparatus were not mounted.

7 Claims, 5 Drawing Figures

BRUSH CLEARING APPARATUS FOR A BULLDOZER BLADE

BACKGROUND OF THE INVENTION

1. Field of the Invention

The present invention relates to a brush clearing apparatus for a bulldozer blade, and more particularly to such an apparatus suitable for mounting on a conventional bulldozer blade to remove brush during reverse movement of a vehicle mounting the blade, the apparatus being conveniently adjustable for use in grabbing and pulling out brush or the like or to allow normal pushing action of the blade.

2. Description of the Prior Art

It is well known to utilize conventional bulldozer blades mounted on suitable vehicles for removing brush from earth surfaces by a pushing action, commonly known as "bucking". Typically, such blades are mounted on their respective vehicles for raising and lowering by hydraulic rams. Existing bulldozer blades are effective for bucking brush and the like, but can only remove brush when the vehicle and blade are moved toward brush to be removed. As a result, prior art bulldozer blades cannot be used for clearing brush when it is impossible or dangerous to move toward brush to be removed, as when the brush is adjacent to a wall or on the brink of a canyon.

SUMMARY OF THE INVENTION

It is an object of the present invention to provide an improved brush clearing apparatus for mounting on a bulldozer blade.

Another object is to provide such an apparatus which can grab and pull brush from the earth surface when the blade and apparatus are moved in a direction away from the brush.

Another object is to provide such an apparatus which is, selectively, positionable in front of a bulldozer blade for use or retracted upwardly so that the blade is usable in the conventional manner.

Another object is to provide such an apparatus which is conveniently attached to and detached from a bulldozer blade.

Another object is to provide such an apparatus which requires the addition of no more than two hydraulic rams, or the like, to adapt a vehicle equipped with a conventional bulldozer blade for use with the apparatus.

A further object is to provide such an apparatus which is economical, sufficiently rugged for removal of heavy brush, durable, and fully effective in accomplishing its intended purposes.

DESCRIPTION OF THE PREFERRED EMBODIMENT

Figure 1:
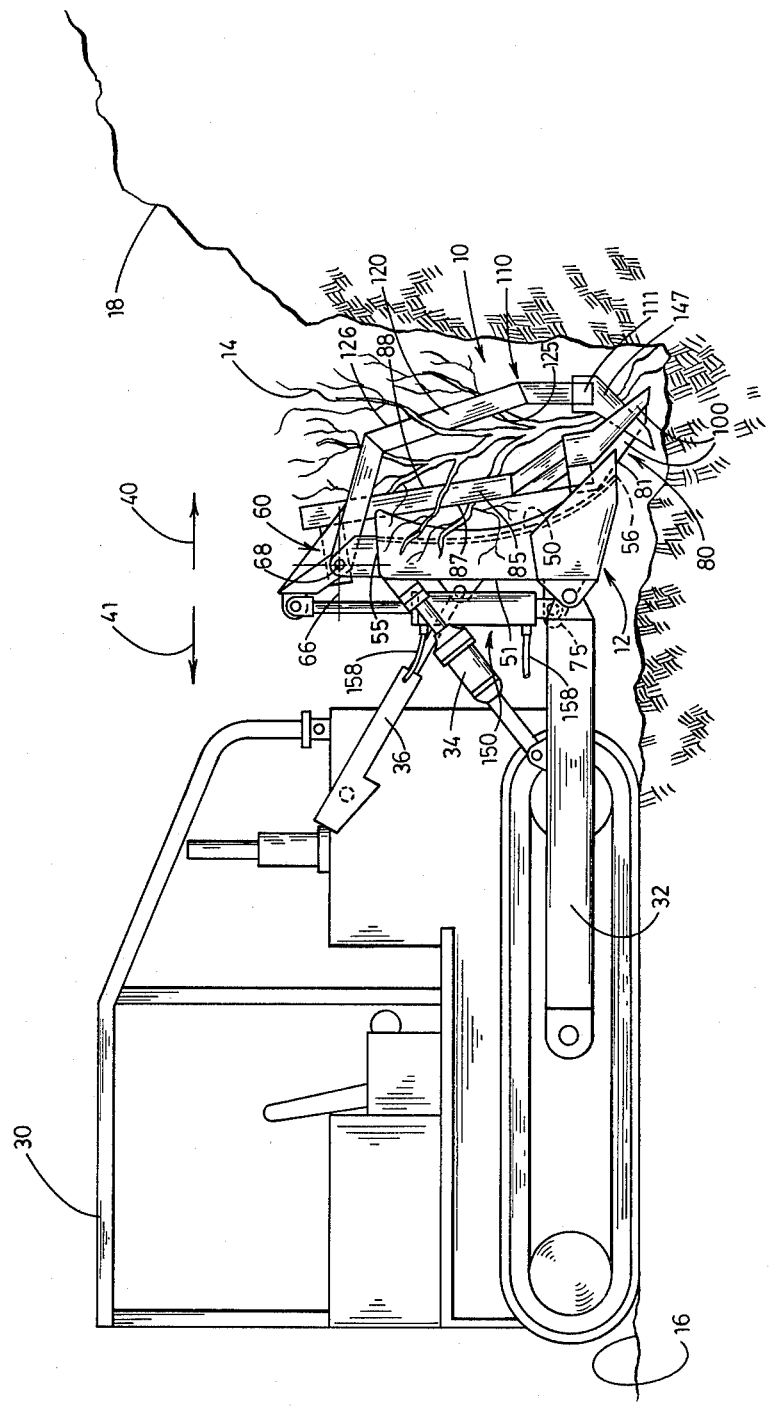
FIG. 1 is a side elevation of a brush clearing apparatus, which embodies the principles of the present invention, mounted on a bulldozer blade, in a representative operating environment which includes a vehicle mounting the blade and an earth surface having brush growing therein and having an obstruction adjacent to the brush.

Referring more particularly to the drawings, in FIG. 1 is shown a brush clearing apparatus 10, which embodies the principles of the present invention, mounted on a bulldozer blade 12 and depicted in a representative operating environment which includes brush 14 growing in the earth surface 16 closely adjacent to an illustrative obstruction 18.

The blade 12 is of well-known construction and is mounted on a vehicle 30 of any suitable type. The blade is mounted in the usual manner by a pair of generally horizontal arms 32 disposed transversely oppositely of the vehicle and forwardly extended therefrom. Each arm has a rearward end pivotally connected to the vehicle and a forward end pivotally connected to the blade. A pair of braces 34 are inclined individually upwardly from the arms to the blade. A pair of hydraulic rams 36 are disposed transversely oppositely of the vehicle. The rams extend upwardly and rearwardly from the blade to the vehicle and each is pivotally connected to the vehicle and to the blade. The rams are connected to any suitable power driven source, not shown, of hydraulic fluid under pressure. The source is mounted on the vehicle and is controllable selectively to cause the rams to extend or contract in a well-known manner, thereby raising or lowering the blade and the apparatus 10 relative to the vehicle.

The vehicle 30 is adapted to move longitudinally in a forward direction or a rearward direction, as indicated, respectively, by the arrows 40 and 41.

Figure 2:
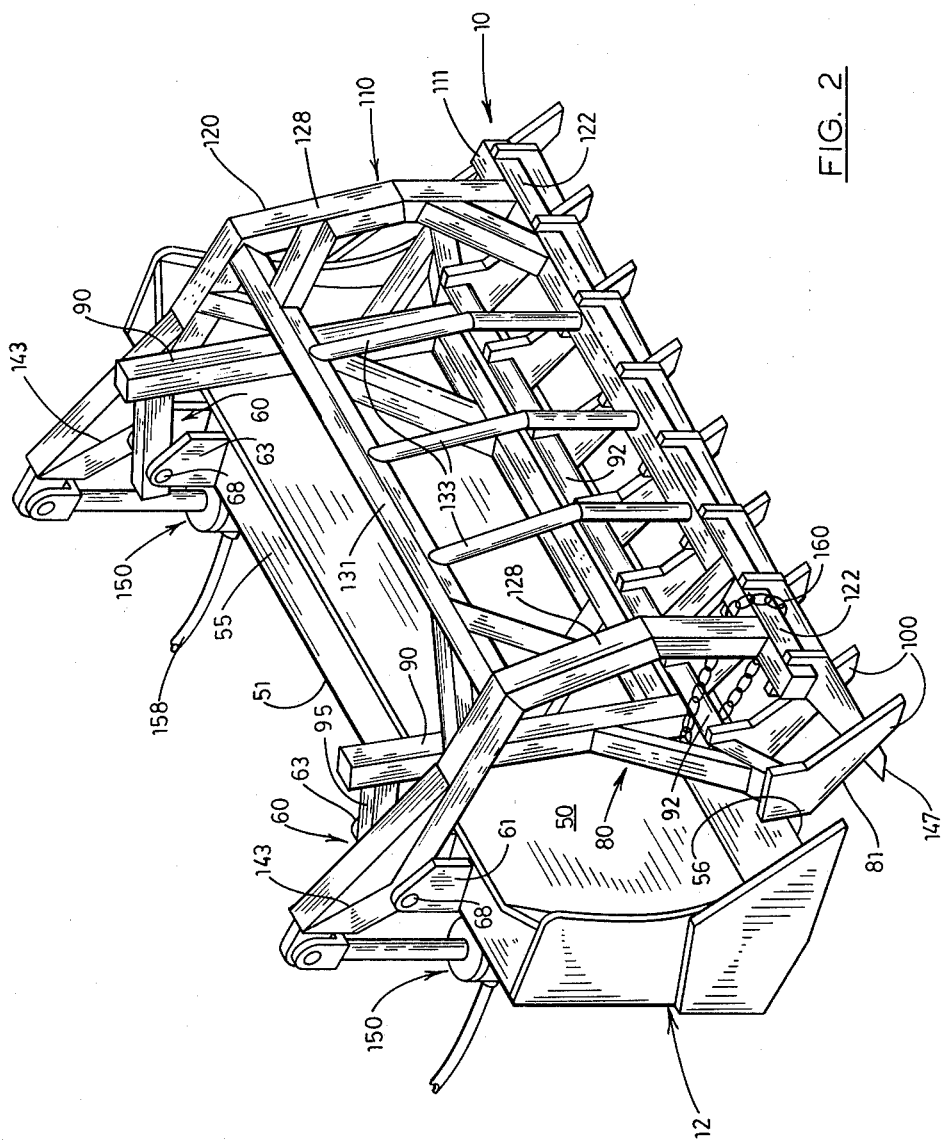
FIG. 2 is a perspective view, at an enlarged scale, of the apparatus and blade of FIG. 1 approximately in the disposition of FIG. 1 with a clamp and a rake of the apparatus interconnected for purposes subsequently described.

Referring to FIGS. 1 and 2, it is seen that the blade 12 is of generally upright, planar configuration, is substantially rectangular viewed along the directions 40 or 41, and extends transversely of these directions. The blade has a forward or bulldozing face 50 which faces away from the vehicle and is somewhat concave, being adapted to engage material to be bulldozed when the vehicle moves in the forward direction. The blade has a rearward face 51 which is disposed toward the vehicle. The blade has a generally horizontal and transversely extending upper edge 55 and a lower edge 56 which is substantially parallel to the upper edge.

Figure 3:
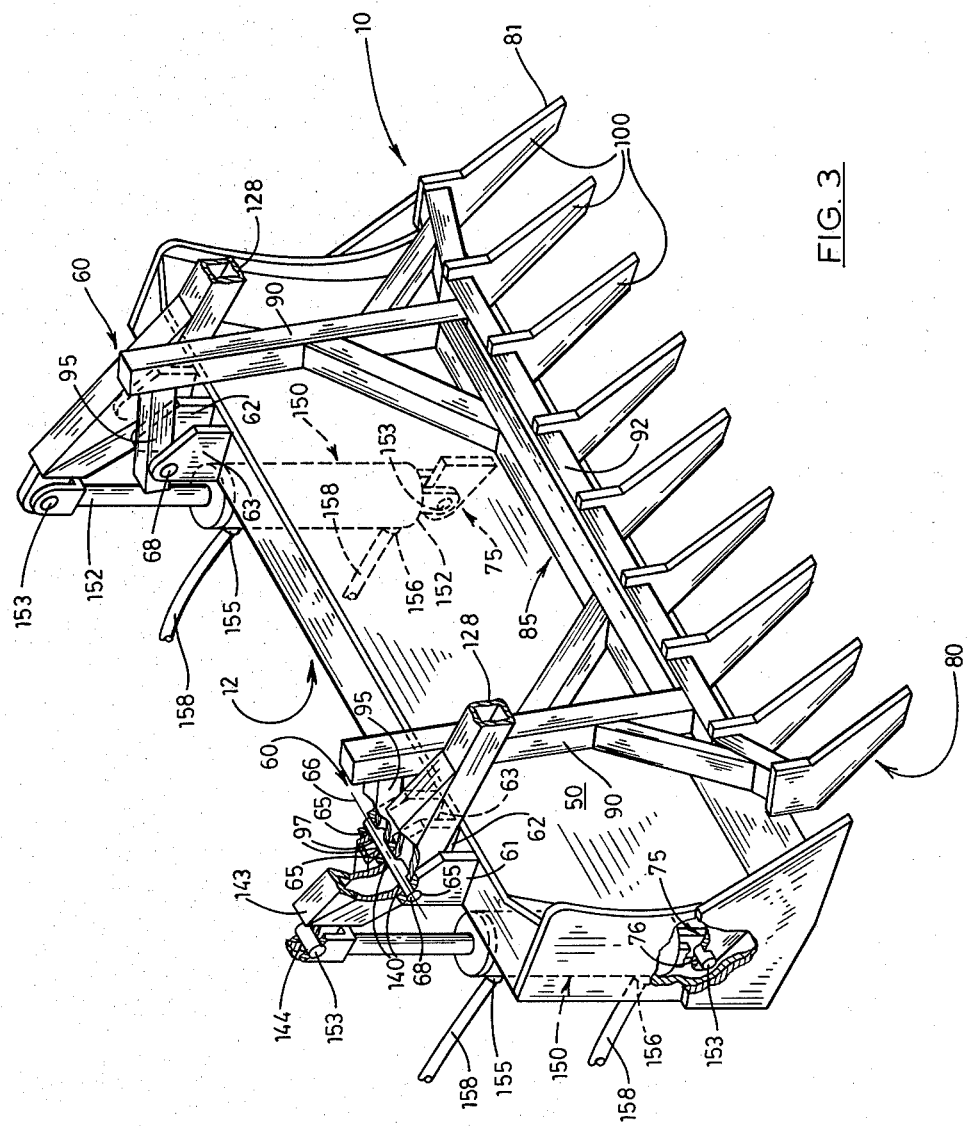
FIG. 3 is a view similar to FIG. 2 with portions of the apparatus and blade broken away for illustrative convenience and with the clamp fragmentarily represented and in an alternate disposition from that of FIG. 2.

The apparatus 10 includes a pair of substantially identical pivot assemblies 60, best shown in FIGS. 1 and 3, mounted on the upper edge 55 of the blade 12 in transversely spaced relation. Each assembly has three ears 61, 62, and 63, which are fixedly connected to the blade and extend upwardly from the upper edge in substantially equally spaced relation therealong. The ear 61 is disposed transversely outwardly of the blade; the ear 63 is disposed toward the center of the blade, and the ear 62 is disposed between the ears 61 and 63. The ears of both assemblies are aligned transversely of the blade and the six ears have individual bores 65 which are aligned about a transversely extending pivotal axis 66 extended along the upper edge in upwardly adjacent relation thereto. A pin 68 is extended through the three bores of each pivot assembly and is secured in position axially therein in any suitable manner.

The apparatus 10 has a pair of ram mounts 75 disposed on the rearward face 51 of the blade 12 adjacent to its lower edge 56. Each mount has an ear which is similar to one of the ears 61, 62, or 63 in being fixedly connected to the blade and in having a bore 76 which is parallel to the bores 66. Each ram mount is disposed centrally between the adjacent pairs of the ears 61 and 62.

It is apparent that the ears 61, 62, and 63 and the mounts 75 can be provided on a bulldozer blade 30 when it is initially manufactured or can be easily added to an existing blade by welding, in the field if desired.

The apparatus 10 has a rake 80, best shown in FIGS. 1 and 3 of unitary, preferably welded, construction. The rake is mounted on the blade 12 by the assemblies 60 for pivotal movement about the axis 66 between a lower, operational attitude or position 81, depicted in FIGS. 1 and 4, in which the rake is gravitationally rested against the forward face 50, and an upper, retracted position 82, depicted in FIG. 5, in which the entire rake is disposed upwardly of the upper edge 55. The rake has a rake frame 85 which is disposed forwardly of the forward face and which is disposed in generally upright, covering relation thereto when the rake is in the lower position. The frame has a first side 87, which conforms to the forward face and which is disposed theretoward in the lower position, and has an opposite, second side 88.

The frame 85 has a pair of main bars 90 which extend in planes normal to the axis 66 and which, in the lower position 81, extend downwardly along the forward face 55 from an elevation somewhat above this axis. Each bar terminates in a lower end which is upwardly adjacent to the lower edge 56 when the rake is in the lower position. These lower ends are interconnected by a distal portion or transverse bar 92 of the rake. This bar extends along the forward face and engages it immediately upwardly of the lower edge when the rake is in the lower position. It is apparent, therefore, that the frame extends from the axis 66 a distance approximately equal to the distance between this axis and the lower edge of the blade. As best shown in FIG. 3, the outer ends of the distal portion are configured so as to extend somewhat forwardly of the balance of this portion when the rake is in the lower position. Preferably, the frame includes a reinforcing bar which extends in parallel, upwardly adjacent relation to the transverse bar and which interconnects the main bars 90. The frame is further reinforced by two pairs of braces, each pair being individual to the main bars and diverging transversely therefrom toward the transverse bar. Transversely of the blade, the main bars are individually centered between the corresponding pairs of ears 62 and 63. Each main bar is provided, at its end opposite the transverse bar 92, with a lug 95 which extends from the main bar into intersecting relation with the axis 66 between the corresponding pair of ears and which is provided with a bore 97 which is pivotally fitted to the corresponding one of the pins 68.

The rake 80 has a plurality of rake teeth 100, best shown in FIGS. 1 and 3, which are mounted on the transverse bar 92 in substantially equally transversely spaced relation therealong. The teeth are disposed, so that as seen in side elevation in FIG. 1, they extend from the transverse bar in approximate alignment with the main bars 90 and thus extend forwardly and downwardly from the lower edge 56 of the blade 12 when the rake is in its lower position 81.

The apparatus 10 has a clamp 110, best shown in FIGS. 1 and 2, constructed similarly to the rake 80 and, similarly, mounted on the blade 12 by the assemblies 60 for pivotal movement about the axis 66. The clamp pivots about this axis between a lowered position 111, shown in FIG. 1, which is assumable only when the rake is in the lower position 81, and a raised position 112 shown in FIG. 5. Since the pivotal axes of the clamp and the rake are coincident, these axes are, of course, parallel.

The clamp 110 has a clamp frame 120 which is disposed forwardly of the forward face 50 of the blade 12 and extends from the axis 66 to a distal portion or lower transverse bar 122 of the rake frame. This transverse bar is substantially parallel to the bar 92 and rests thereagainst when the clamp is in its lowered position 111, the rake then being in its lower position 81 as before stated. The transverse bar of the clamp is thus spaced from the axis a distance substantially equal to the distance between the axis and the lower edge 56 of the blade 12 and is adjacent to the teeth 100 when the clamp is in its lowered position. In this position, the clamp frame is disposed forwardly of the rake frame 85, is adjacent to the forward face 50 in the direction 40, and is elevationally adjacent to the lower edge 56. In side elevation, as viewed in a direction along the axis and depicted in FIG. 1, the clamp frame is of arched configuration between its transverse bar and the axis 66, having a concave side 125 and an opposite convex side 126. The concave side is disposed toward the rake frame 85 and toward the forward face when the clamp is in the lowered position. When the clamp is in its raised position 112, the clamp frame is disposed substantially upwardly of the upper edge 55. This frame, typically, has a pair of side bars 128 which extend individually from between the adjacent pairs of the ears 61 and 62 to the transverse bar 122 in a plane substantially normal to the axis 66. Each side bar has three straight sections connected in angled relation so that the side bars conform to the arched configuration of the clamp frame. The pair of junctions of these sections adjacent to the axis are interconnected by an upper transverse bar 131 and the clamp frame is reinforced by a plurality of relatively short diagonal bars individual to each junction of the side bars and the transverse bars. The clamp frame has three closure bars 133, best shown in FIG. 2, which individually interconnect these transverse bars and are disposed parallel to the side bars in transversely spaced relation therebetween, each closure bar having generally the same shape as the portions of the side bars extending between the transverse bars.

Each side bar 128 is provided with a bore 140 which is pivotally fitted to the corresponding pin 68 between the associated ears 61 and 62. The clamp 110 has a pair of substantially identical lever arms 143 individual to the side bars. These arms are fixedly mounted on the side bars adjacent to the bores therein and are disposed oppositely of the side bars from the upper edge 55 of the blade 12. Each lever arm extends above the blade from the axis 66 in a direction opposite of the frame 120 to a point above the rearward face 51 and terminates in a distal end which is aligned transversely with the corresponding ram mount 75 and which has a bore 144 parallel to the bores 76. The lever arm is configured so that its bore moves in an arc which is rearward of the blade as the clamp moves between its positions 111 and 112.

The clamp 110 has a plurality of clamp teeth 147 which are mounted on the transverse bar 122 in transversely spaced relation. The clamp teeth alternate with the rake teeth 100 and, individually, are substantially identical thereto. The clamp teeth are spaced so that, when the clamp is in its lowered position, these teeth extend rearwardly and downwardly from the transverse bar in interfitting, intermeshed relation with the rake teeth. As best shown in FIGS. 1 and 2, when the clamp is in its raised position 112, its teeth are disposed substantially upwardly of the upper edge of the blade.

The apparatus 10 has a pair of contractible and extensible pressure-motivated hydraulic rams disposed in a generally upright attitude oppositely of the blade 12 from its face 50. Each ram has a pair of opposite ends 152 individually pivotally connected to one of the arms 143 and to the corresponding one of the mounts 75 by pins 153 fitted individually through the ends and the corresponding bore 144 of 76. As a result, extension of the ram pivots the clamp 110 toward its lowered position 111 and contraction of the ram pivots the clamp toward its raised position 112. Each ram has a contracting hydraulic connection 155 and an extending hydraulic connection 156 which, typically, are individually connected by fragmentarily represented hoses 158 to the previously identified power driven source of hydraulic fluid under pressure utilized for the rams 36. This source is adapted in a well-known manner selectively and simultaneously to supply fluid under pressure to the contracting or the extending pair of the connections while allowing fluid to exhaust from the other pair of connections so that the clamp is selectively caused to pivot toward the corresponding position.

Figure 5:
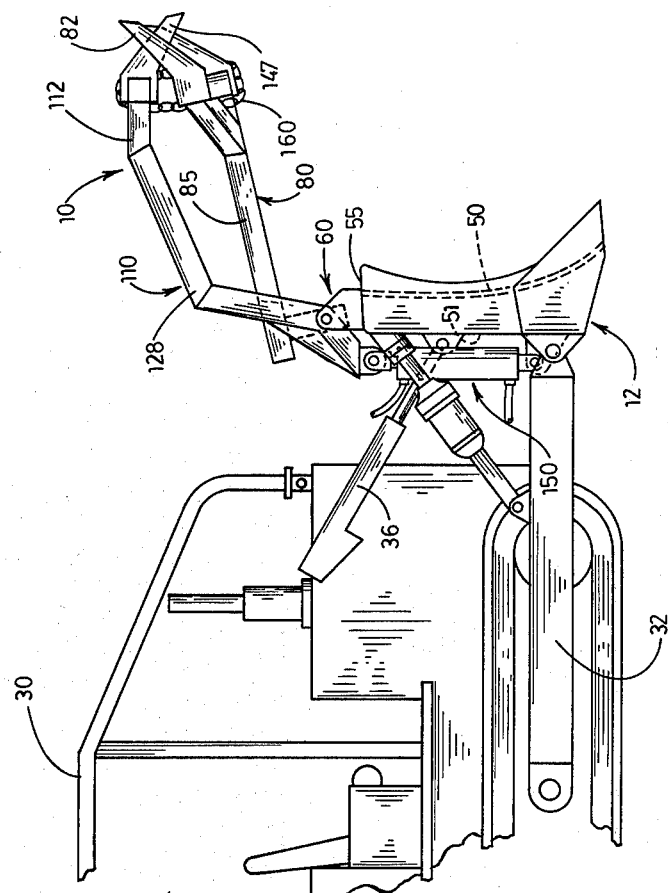
FIG. 5 is a side elevation similar to FIG. 4 with a rake of the apparatus in an alternate position and connected to the clamp as in FIG. 2.

The apparatus 10 includes a chain 160 which is selectively adapted to be secured in any suitable manner in a disposition in which the chain is wrapped about the bars 92 and 122, as shown in FIGS. 2 and 5, or to be detached from the balance of the apparatus. When so wrapped, the chain connects the rake 80 to the clamp 110 for movement therewith so that movement of the clamp toward its raised position 112 by the rams 150 carries the rake into its upper position 82 so that the clamp, the rake, and their respective teeth 147 and 100 are disposed substantially above the forward face 50 of the blade 12.

OPERATION

The operation of the described embodiment of the subject invention is believed to be clearly apparent and is briefly summarized at this point.

Figure 4:
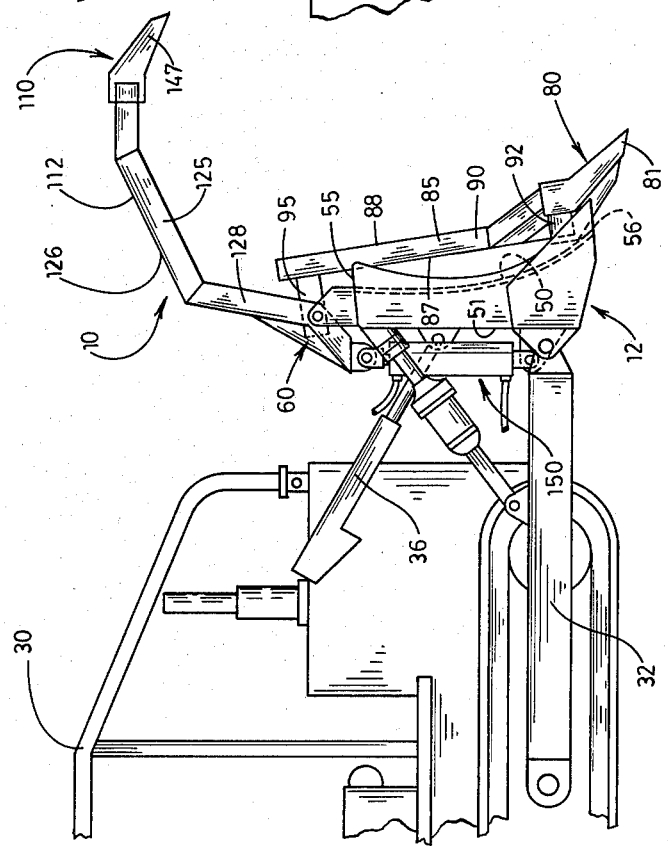
FIG. 4 is a side elevation of the apparatus and blade of FIG. 1 with the clamp in an alternate position and with the vehicle fragmentarily represented.

When the apparatus 10 is disposed for clearing brush 14, the rake 80 is disposed in its lower position 81 wherein the rake is rested against the blade 12 as best shown in FIGS. 1 and 4. Initially, the clamp is pivoted into its raised position 112 with the rams 150. Typically, the blade, together with the rake, is then elevationally positioned with the rams 36 so that the rake teeth 100 properly engage the earth surface 16 downwardly of the roots of the brush as the vehicle 30 is driven in the forward direction 40. The clamp is then pivoted into its lowered position 111 so that its teeth 147 intermesh with the rake teeth adjacent to the roots of the brush and the above-ground portion of the brush is grasped by both sets of teeth and received between the second side 88 of the rake frame 85 and the concave side 125 of the clamp frame 120. With the brush so grasped, the vehicle is driven in the rearward direction 41, pulling the brush from the earth. When the brush is disengaged from the earth, the brush is deposited in any suitable location by maneuvering the vehicle, and the brush is released at such location by pivoting the clamp to its raised position with the rams 150.

When it is desired to use the bulldozer blade 12 in the conventional manner, the vehicle 30 is stopped with the rake 80 in its lower position 81 and the clamp 110 pivoted into the lowered position 111. The chain 160 is then wrapped about the bar 92 of the rake and about the bar 122 of the clamp, typically in the manner shown in FIGS. 2 and 5, interconnecting the rake and the clamp. The clamp is then moved by the rams 150 into the raised position 112 carrying the interconnected rake into its upper position 82, as shown in FIG. 5. The rake and clamp and their respective teeth 100 and 147 are then disposed upwardly of the upper edge 55 of the blade so that its bulldozing face 50 is not obstructed by the apparatus 10 and is usable in the conventional manner.

If use of the apparatus 10 is not required for an extended period of time, the apparatus is easily detached from the blade 12 by withdrawing the pins 68 and the pins 153 and lifting the apparatus from the blade, the apparatus being conveniently re-attached to the blade for further use by reversing these operations.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A brush clearing apparatus for mounting on a bulldozer blade or the like, the blade having an upper edge, a lower edge, a bulldozing face extended transversely of a predetermined longitudinal direction of bulldozing movement to engage materials being bulldozed when the blade moves in such direction, and a face opposite of the blade from the bulldozing face, the apparatus comprising:

A. a rake which has a plurality of transversely spaced rake teeth and is mounted on the blade in an attitude in which the teeth extend in said direction from the bulldozing face and downwardly from the lower edge;

B. a clamp mounted on the blade for pivotal movement about a transversely extending clamp axis which is adjacent to the upper edge of the blade, the clamp having a distal portion which is spaced from the axis substantially the distance between the axis and the lower edge and teeth which extend from the distal portion and are disposed transversely in alternating spaced relation between the rake teeth, the clamp being adapted to pivot about the axis between a lowered position, in which the distal portion is longitudinally adjacent to the bulldozing face and is elevationally adjacent to the lower edge and in which the rake teeth and the clamp teeth are disposed in interfitted relation, and a raised position in which the distal portion and clamp teeth are disposed substantially upwardly of the upper edge; and C. power means connecting the clamp and the blade selectively for pivoting the clamp toward the lowered position and toward the raised position.

2. The apparatus of claim 1 wherein the clamp has a lever arm extended from said axis above said opposite face of the blade and wherein the power means comprises a contractible and extensible element disposed oppositely of the blade from the bulldozing face and having opposite ends individually connected to the arm and to said opposite face so that contraction of the element pivots the clamp toward the raised position and extension of the element pivots the clamp toward the lowered position.

3. The apparatus of claim 1 wherein the rake is mounted on the blade for pivotal movement about a rake axis which is adjacent to the upper edge and is substantially parallel to the clamp axis, the rake having a distal portion from which the rake teeth extend and which is spaced from the rake substantially the distance between the clamp axis and the lower edge, the rake being adapted to pivot about the rake axis between a lower position in which the rake is disposed in said attitude and in which the distal portion of the rake is gravitationally rested against the bulldozing surface and is adjacent to the lower edge and an upper position in which the distal portion of the rake and the first teeth are disposed substantially upwardly of the upper edge.

4. The apparatus of claim 3 wherein the apparatus further comprises means selectively for connecting the rake to the clamp for pivotal movement therewith so that movement of the clamp toward the raised position thereof by the power means carries the rake with the clamp toward the upper position thereof.

5. In combination with a bulldozer blade of generally rectangular and generally upright configuration having a forward face for engaging material being bulldozed, an opposite rearward face; a transversely extending, generally horizontal upper edge; and a transversely extending, generally horizontal lower edge, a brush clearing apparatus comprising:

A. pivot means mounted on the upper edge of the blade defining a pivotal axis extended therealong in upwardly adjacent relation thereto;

B. a rake mounted on the pivot means for movement about the axis, the rake having a rake frame which is disposed forwardly of the forward face, which generally conforms thereto, and which extends from the axis a distance approximately equal to the distance between the axis and the lower edge; the rake being adapted to pivot downwardly into an operational position in which the frame is gravitationally rested on the forward face and to pivot upwardly into a retracted position in which the rake is disposed upwardly of the upper edge; and the rake having a plurality of transversely spaced rake teeth mounted on the rake frame and disposed thereon so as to extend downwardly and forwardly from the lower edge when the rake frame is in the operative position;

C. a clamp mounted on the pivot means for movement about the axis, the clamp having a clamp frame which is disposed forwardly of the forward face and which has a distal portion spaced from the axis a distance approximately equal to the distance between the axis and the lower edge; the clamp being adapted to pivot into a raised position in which the clamp frame is disposed upwardly of the upper edge and, when the rake is in the operative position, being adapted to pivot into a lowered position in which the distal portion is adjacent to the teeth of the rake and in which the clamp frame is disposed forwardly of the rake frame; the clamp frame being of arched configuration between the distal portion thereof and the axis, providing a concave side of the clamp frame disposed toward the rake frame when the clamp is in the lowered position; the clamp having a plurality of clamp teeth mounted on the distal portion and disposed thereon so as to extend therefrom rearwardly and downwardly in intermeshed relation with the rake teeth when the clamp is in the lowered position; and the clamp having a lever arm fixedly connected to the clamp frame and extended therefrom oppositely of the axis and rearwardly of the blade; and D. a contractible and extensible pressure-motivated ram disposed oppositely of the blade from the forward face, the ram having opposite ends individually pivotally connected to the rearward face and to the lever arm so that contraction of the ram pivots the clamp toward the raised position and extension of the ram pivots the clamp toward the lowered position.

6. A brush clearing apparatus comprising:

A. a blade;

B. means mounting the blade for earth traversing movement, the blade having an upper edge, a lower edge, a bulldozing face extended transversely of a predetermined longitudinal direction of bulldozing movement to engage materials being bulldozed when the blade moves in such direction, and a face opposite from the blade from the bulldozing face;

C. a rake having a plurality of transversely spaced teeth mounted on the blade in an attitude in which the teeth extend in said direction from the bulldozing face and downwardly from the lower edge thereof;

D. a clamp mounted for pivotal movement about a clamp axis extending transversely of the blade adjacent to the upper edge thereof, the clamp having a distal portion which is spaced from the clamp axis substantially the distance between the axis and the lower edge of the blade, the clamp being adapted to pivot about the axis between a lowered position, in which the distal portion is adjacent to the bulldozing face of the blade, and a raised position in which the distal portion is disposed substantially upwardly of the upper edge of the blade; and E. power means connecting the clamp and the blade selectively for pivoting the clamp toward the lowered position and toward the raised position.

7. The brush clearing apparatus of claim 6 in which teeth extend from the distal portion of the clamp and are disposed transversely in alternating spaced relation between the rake teeth when the clamp is in lowered position.

* * * * *